United States Patent [19]

Dempsey

[11] Patent Number: 5,483,812
[45] Date of Patent: Jan. 16, 1996

[54] ROLL APPARATUS FOR REDUCING WORK

[75] Inventor: Martin J. Dempsey, Bethel Park, Pa.

[73] Assignee: Asko, Inc., Homestead, Pa.

[21] Appl. No.: 193,455

[22] Filed: Feb. 8, 1994

[51] Int. Cl.$^6$ ...................................................... B21B 27/02
[52] U.S. Cl. .................. 72/252.5; 492/1; 492/47
[58] Field of Search .................................. 72/237, 241.2,
72/243.6, 252.5; 492/1, 3, 21, 38, 39, 45, 47

[56] References Cited

U.S. PATENT DOCUMENTS

| 4,008,598 | 2/1977 | Purcipile et al. | 492/1 |
| 4,117,705 | 10/1978 | Dempsey | 72/237 |
| 4,208,147 | 6/1980 | Giege et al. | 492/21 |
| 4,841,612 | 6/1989 | Kark | 492/47 |
| 4,932,111 | 6/1990 | Kark | 492/1 |
| 5,109,585 | 5/1992 | Kark | 72/252.5 |

Primary Examiner—Lowell A. Larson
Assistant Examiner—Thomas C. Schoeffler
Attorney, Agent, or Firm—Hymen Diamond

[57] ABSTRACT

Roll apparatus in which the rotation under the tangential force exerted when the apparatus is in use of the rolling rings relative to the arbor is suppressed by the restoring force of the arbor that is elongated and held in the elongated condition exerting an axial pressure on the rolling ring assembly. The arbor is elongated by expansion of a chamber to which the arbor is connected through a thrust ring which forms a boundary of the chamber. In addition to the thrust ring, the boundaries of the chamber are a flanged ring mounted on the arbor, which is fixed, and the arbor. An adjustable spacing collar is connected to the arbor. After the arbor is elongated, the collar is adjusted to engage the flanged ring, thus locking the arbor against contraction. On removal of the impressed pressure, the adjustable collar in contact with the flanged ring and with the arbor constitute a lock to prevent the reduction of the elongation so that the restoring force of the tensioned mandrel is exerted to prevent rotation of the rolls relative to the mandrel when the apparatus is in use.

13 Claims, 8 Drawing Sheets

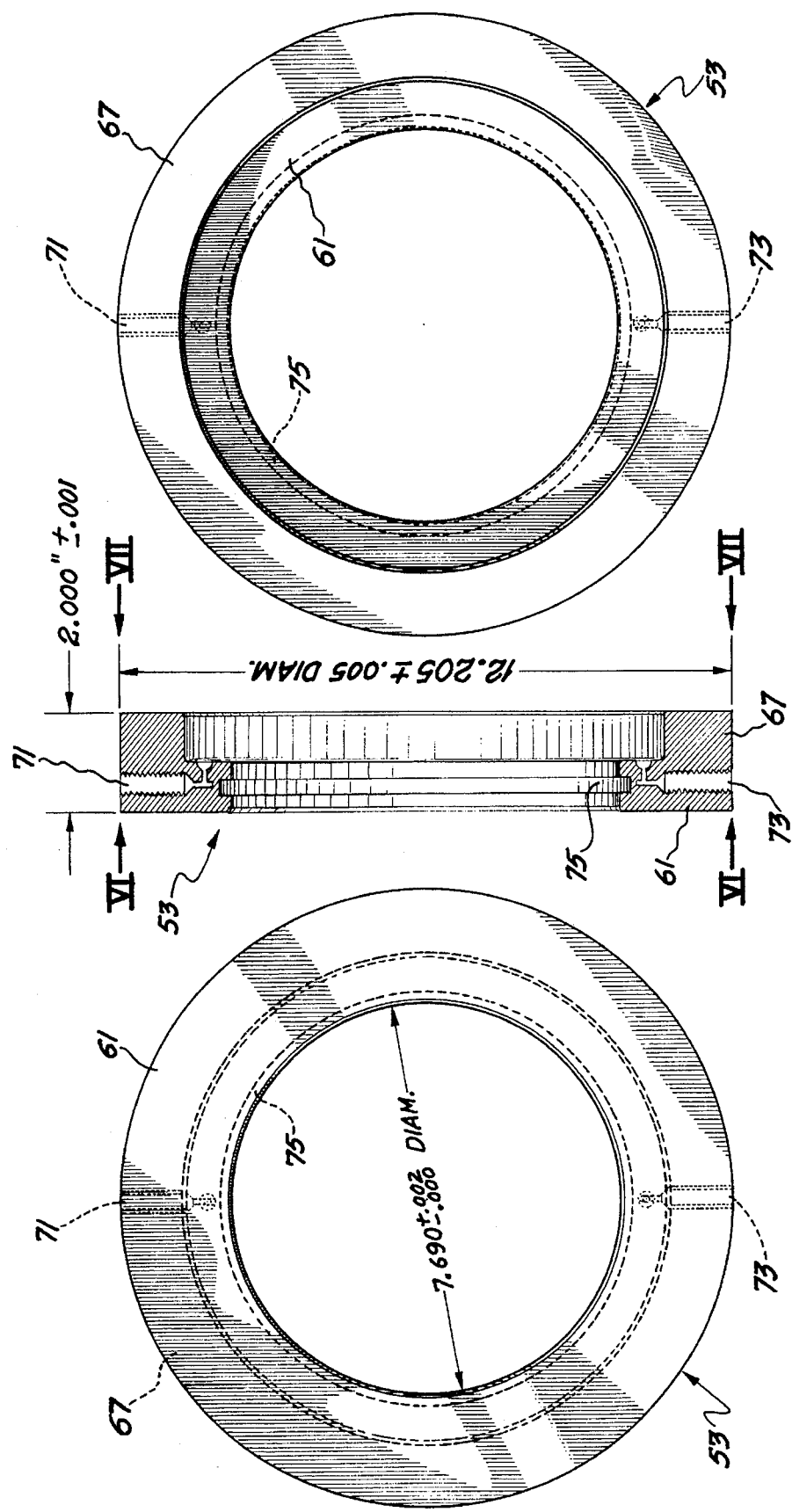

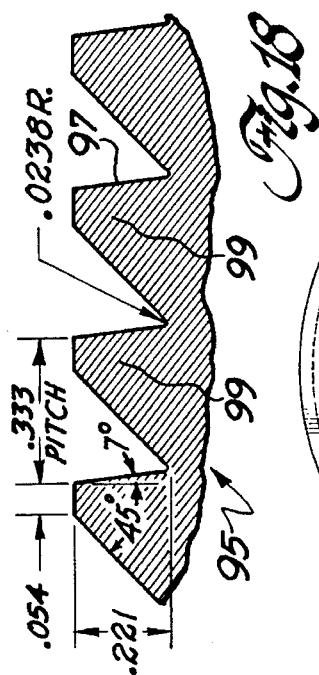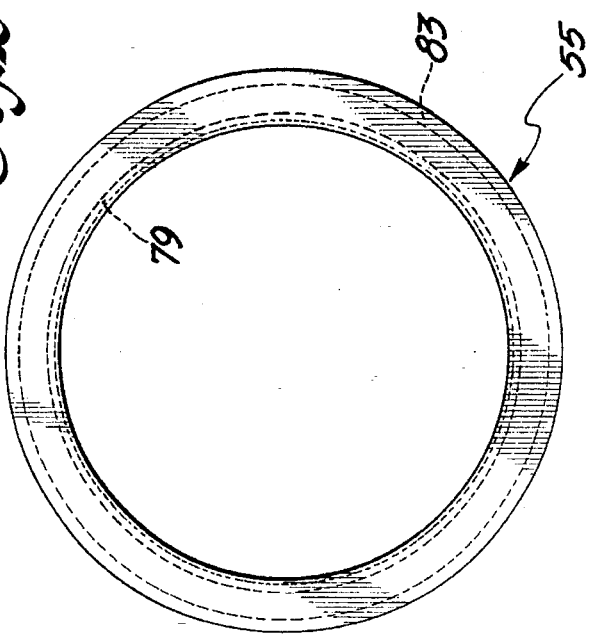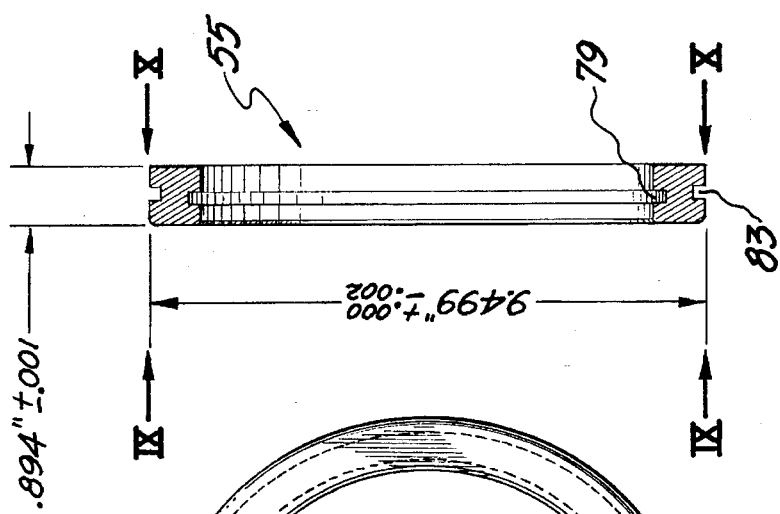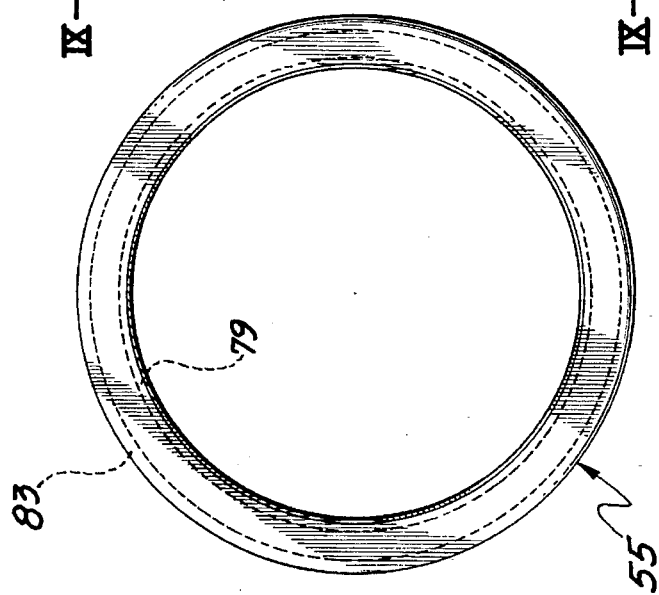

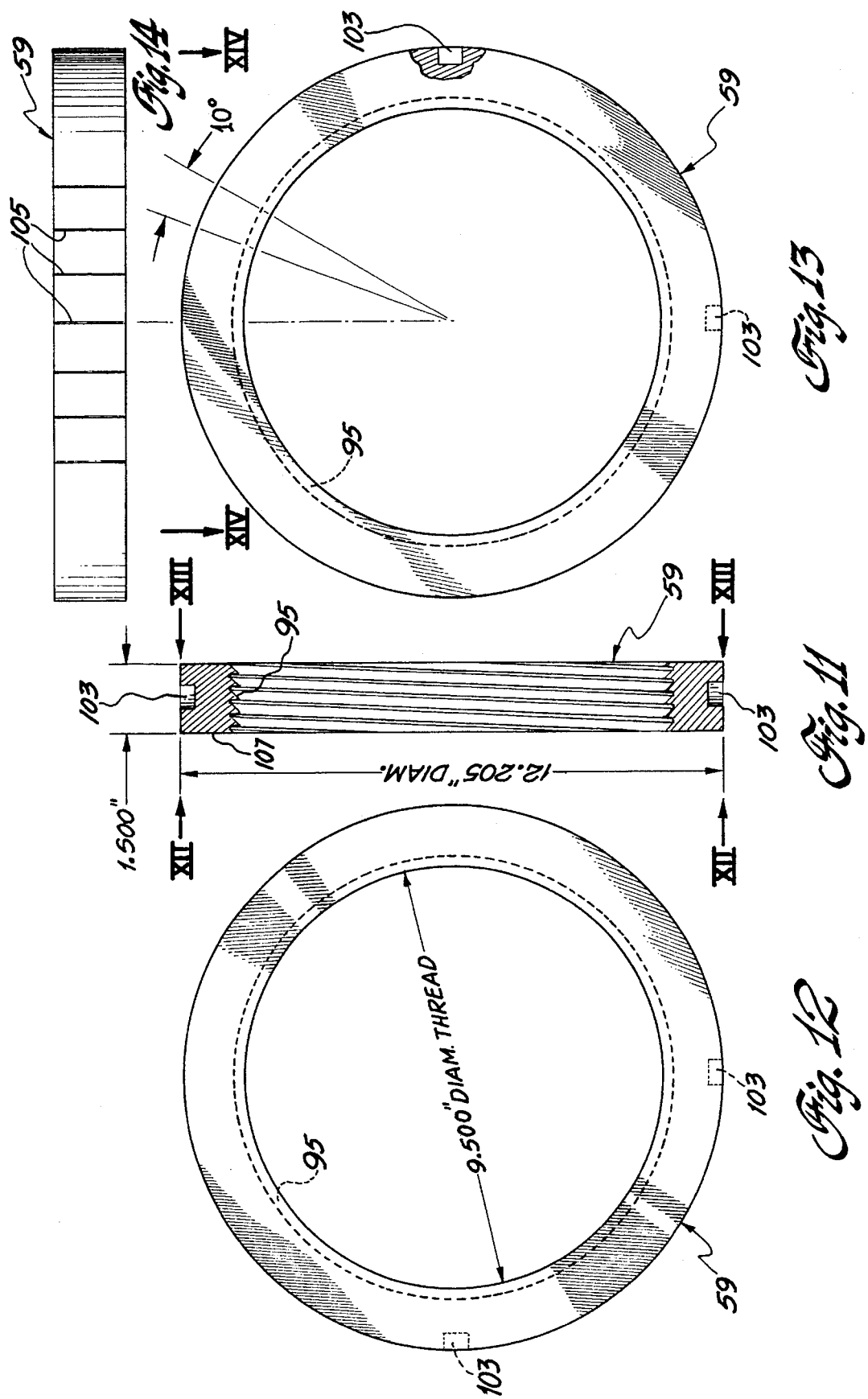

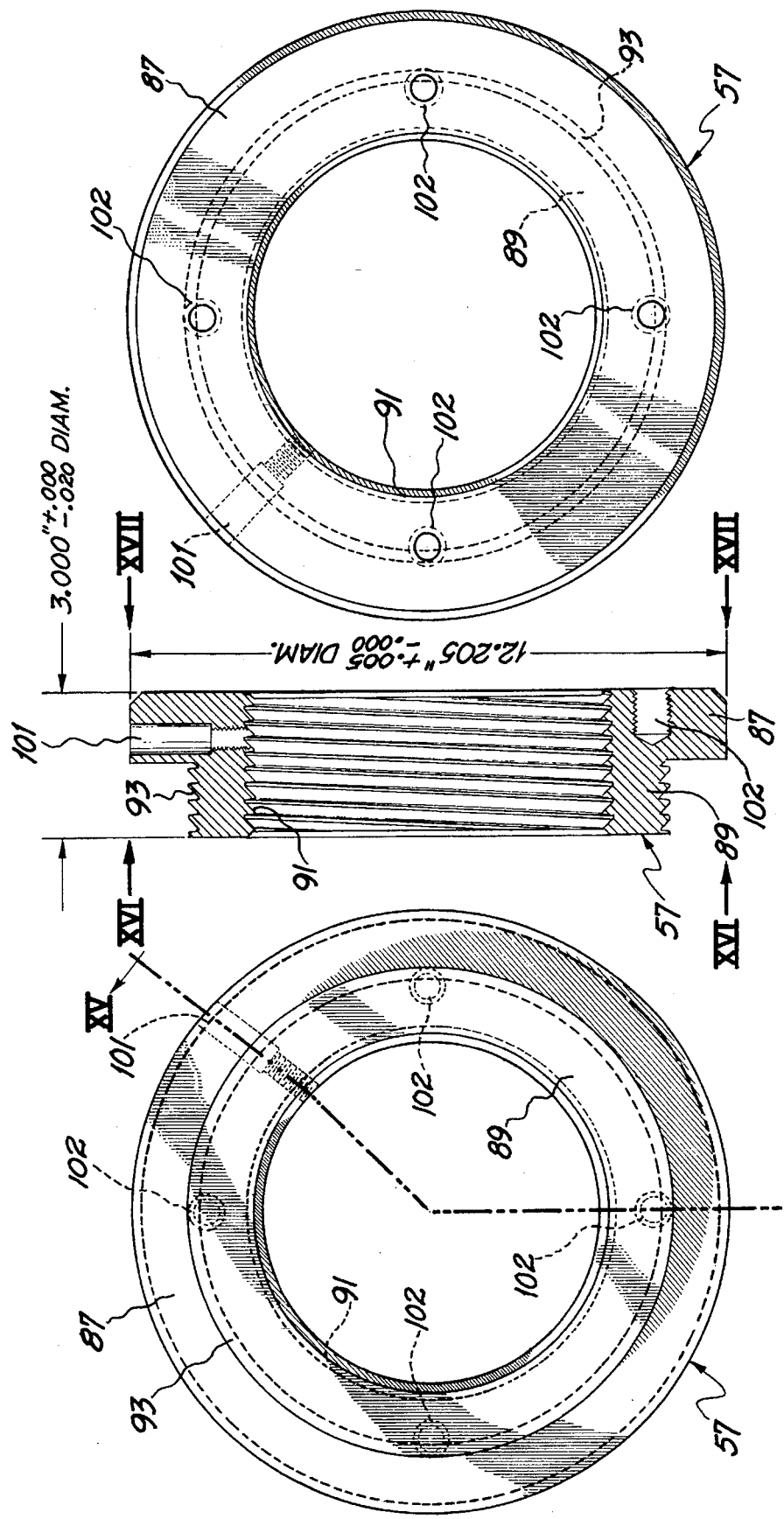

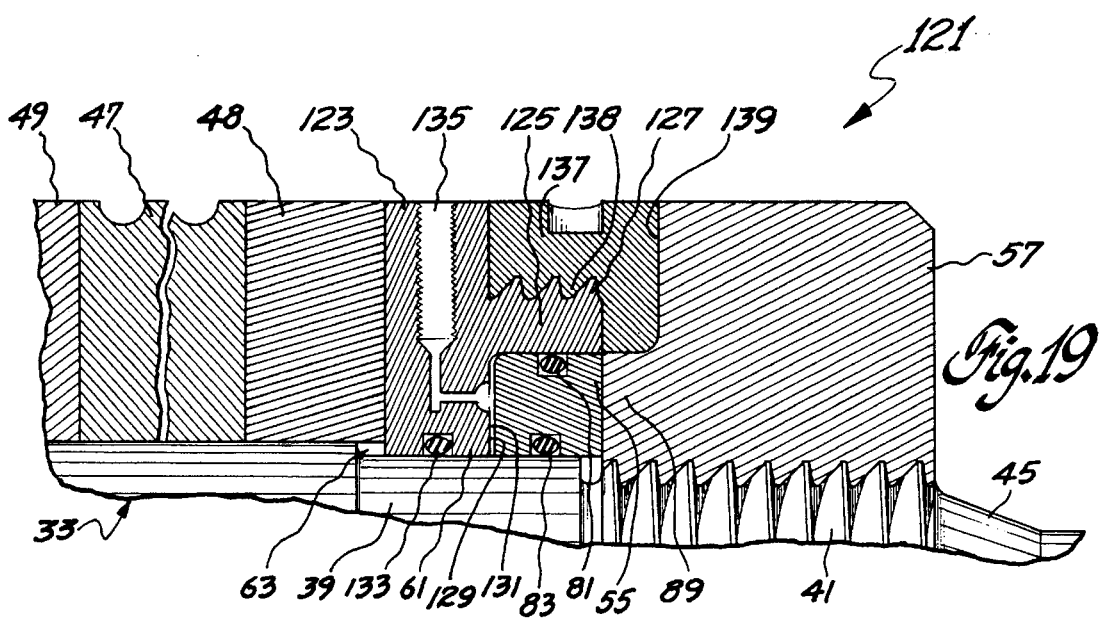
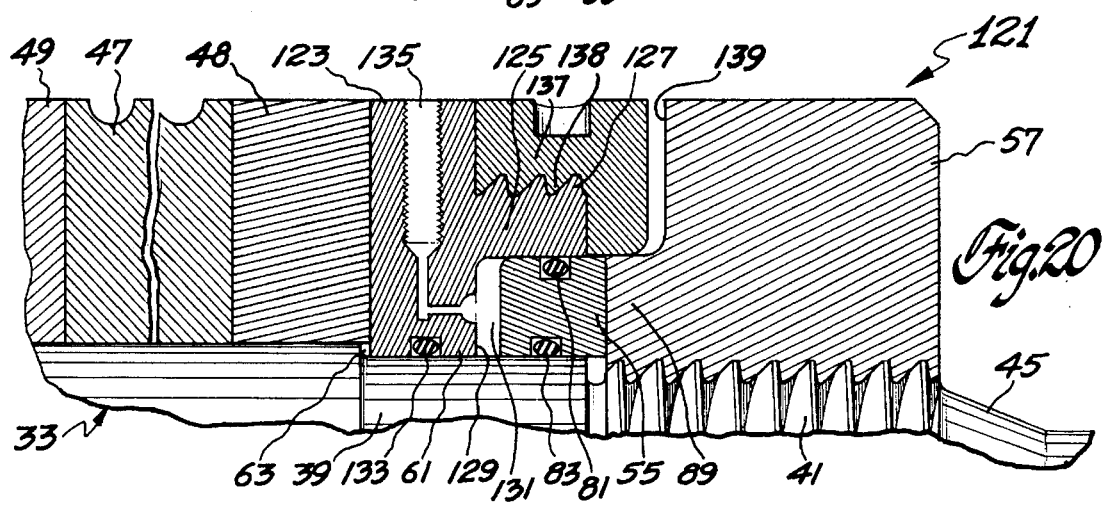
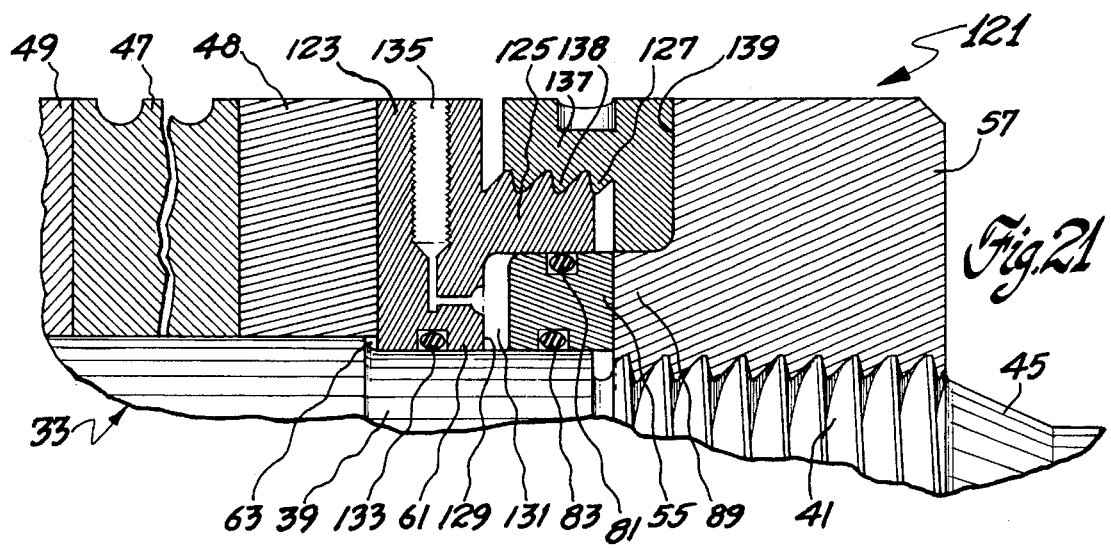

ROLL APPARATUS FOR REDUCING WORK

BACKGROUND OF THE INVENTION

This invention relates to work reduction by rolling rings, such as the reduction of billets to bars and bars to bars of smaller cross-section, or to rods, or to wire. This invention has particular relationship to the prevention or suppression of the rotation of the rolling rings relative to the arbor on which they are mounted under the high tangential reactive forces exerted on the rolling rings during the reduction. To the extent that its teaching is necessary or desirable to supplement the teaching of this application, U.S. Pat. No. 4,117,705 to Martin J. Dempsey (herein Dempsey) is incorporated herein by reference.

Dempsey is typical of the prior art on reduction of the type to which this application relates. Dempsey discloses reduction apparatus with rolling rings (51, (FIG. 1) in which the mandrel or arbor 23 carrying the rolling rings is elongated and thereby tensioned by expansion of a chamber 261 whose boundaries are the shoe 71, the flanged activator 73 and the mandrel. Before the expansion, there is a peripheral gap 263 between the shoe 71 and the activator 73 which is too narrow to receive a split spacer 77. After the expansion, the gap is widened just sufficiently to receive the split spacer which is dimensioned to fill the gap. When the pressure in the chamber 261 is removed, the split ring prevents the mandrel from retracting so that the mandrel remains elongated and its restoring force is applied to prevent rotation of the rolling rings relative to the mandrel.

The apparatus disclosed in Dempsey has operated satisfactorily for many years. But difficulty has been experienced when it became necessary to replace the rolling rings. The replacement resulted in work-reducing apparatus whose dimensions are slightly different than the replaced apparatus. Such difference involves the split spacer 77 and the gap 263 whose dimensions and that of the widened gap in actual practice differ only by a few thousandths of an inch. Typically, the split spacer has a width of 0.270-inch and the gap is widened from 0.2456 to 0.272-inch. Changes in the dimensions of the apparatus on replacements have resulted in a gap which is too narrow or too wide for the spacer and have required replacement of the spacer.

It is accordingly an object of this invention to overcome the disadvantage of the prior art work-reducing apparatus and to provide apparatus which shall not require provision of a new spacer on replacement of worn out rolling rings and other parts. Another object of this invention is to provide work-reducing apparatus in which the split spacer of prior art shall be replaced by a mechanism which shall not be affected by changes in the dimensions of the apparatus on replacement of rolling rings.

SUMMARY OF THE INVENTION

In arriving at this invention, it has been realized that the split spacer of the prior art suppresses contraction of the arbor in both directions and that any replacement of the spacer must accomplish this purpose. In accordance with this invention, there is provided work-reduction apparatus in whose use the elongated mandrel or arbor is prevented from contracting by a pressurizer including an adjustable spacing collar integrated internally in the apparatus in such a way as to operate as a rigid lock, preventing contraction of the arbor. In the practice of this invention, the expandable chamber is bounded by a ring forming a part of the pressurizer, typically having a flange or other extension, a thrust ring connected to the arbor and the arbor. The chamber is expanded typically by injecting grease through the flanged ring into the chamber, the annular surfaces of which are typically, at least, twenty-four (24) square inches in area. The area of the annular surfaces may be easily calculated from the equation $$A = \frac{\pi(D_2^2 - D_1^2)}{4}.$$

A is the area of each annular surface, $D_2$ is the outer diameter of the chamber and D, is the inner diameter of the chamber which is identical to the diameter of the reduced diameter of the arbor. Therefore, the typical axial thrust in both directions, that is, toward the rolling rings and toward the nut, is 24 times the typical pressure of 26,000 psi or 624,000 pounds or 312 tons. The grease may be introduced through other members, for example, through the arbor. The adjustable spacing collar is a ring threaded internally to mesh with an external thread on a ring-shaped member on the arbor. Once the chamber is expanded and the arbor elongated, the adjustable spacing collar is engaged with the flanged ring, thus acting as a lock preventing contraction of the elongated arbor. An important feature of this invention is that the adjustable collar is continuously adjustable, whereas the prior art spacers or opposing wedges are discontinuous demanding different spacers for each gap.

BRIEF DESCRIPTION OF THE DRAWINGS

For a better understanding of this invention, both as to its organization and its method of operation, together with additional objects and advantages thereof, reference is made to the following description taken in connection with the accompanying drawings, in which:

FIG. 5 is a view in transverse section of the flanged ring which forms a part of the chamber;

FIG. 6 is a plan view of the flanged ring taken in the direction VI—VI of FIG. 5;

FIG. 7 is a plan view of the flanged ring taken in the direction VII—VII of FIG. 5;

FIG. 8 is a view in transverse section of the thrust ring;

FIG. 9 is a plan view of the thrust ring taken in the direction IX—IX of FIG. 8;

FIG. 10 is a plan view of the thrust ring taken in the direction X—X of FIG. 8;

FIG. 11 is a view in transverse section of the adjustable spacing collar;

FIG. 12 is a plan view of the adjustable spacing collar taken in the direction XII—XII of FIG. 11;

FIG. 13 is a plan view of the spacing collar taken in the direction XIII—XIII of FIG. 11;

FIG. 14 is a view in end elevation of the spacing collar taken in the direction XIV—XIV of FIG. 13;

FIG. 15 is a view in transverse section taken along lines XV—XV of FIG. 16 of the nut which joins the thrust ring to the arbor;

FIG. 16 is a plan view of the nut taken in the direction XVI—XVI of FIG. 16;

FIG. 17 is a plan view of the nut taken in the direction XVII—XVII of FIG. 16;

FIG. 18 is a view in longitudinal section of the external screw thread of the nut and also of the internal screw thread of the adjustable spacer which meshes with this external screw thread;

FIG. 19 is a view in longitudinal section of the pressurizer in standby condition of a modification of this invention;

FIG. 20 is a view similar to FIG. 19 but with the pressurizer in its condition with the chamber expanded by pressure;

FIG. 21 is a view similar to FIG. 20 but with the pressurizer set to preserve the elongation of the arbor on removal of the pressure from the chamber;

Figure 1:
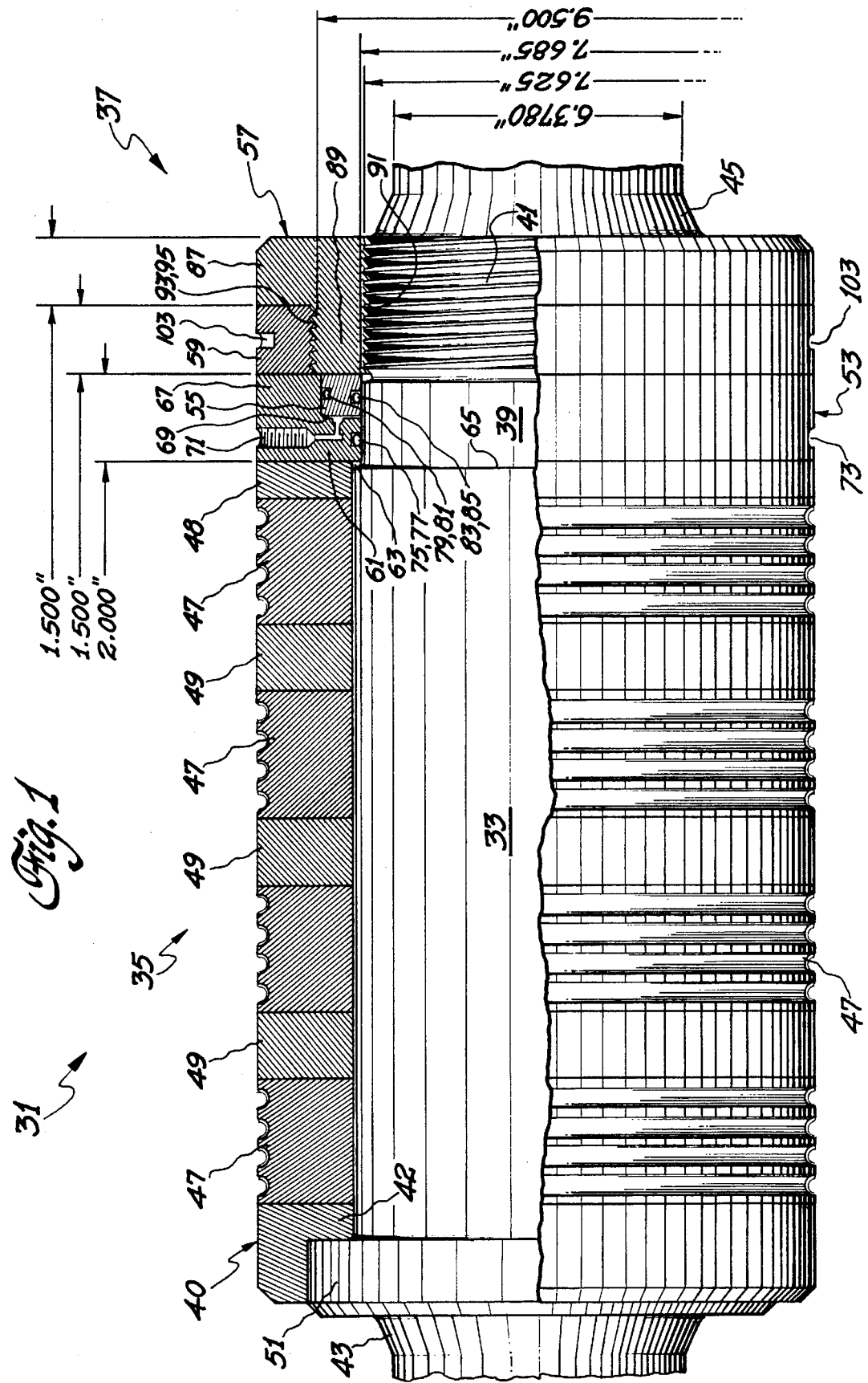
FIG. 1 is a view in side elevation with a part broken away of an embodiment of this invention.

The dimensions which are shown in several views are intended to serve the purpose of aiding those skilled in the art to understand and practice this invention and not in any way to limit the scope of this invention.

DETAILED DESCRIPTION OF EMBODIMENTS

The apparatus shown in the drawings is typical work-reducing apparatus 31 which constitutes an adaptation of this invention. The apparatus 31 includes a rotatable arbor 33, a roll assembly 35 and a pressurizer 37. Typically, the arbor 33 may be composed of AISI-4340 Cr—Ni—Mo alloy steel quenched and tempered to 350 Brinell hardness. Near one end, there is a section 39 of reduced diameter on which there is a screw thread 41. Near the opposite end there is mounted on the arbor an end spacer 40 of L-shaped transverse cross-section. The purpose of this end spacer is to protect the end rolling ring 47 from being broken by an unfavorable component of the rolling force. The L-shape extends the protection to the end of the arbor and permits the web 42 of the spacer to be of minimum thickness. The arbor 33 has journals 43 and 45 by which it may be rotatably supported and driven.

The roll assembly 35 includes a plurality of rolling rings 47 separated by spacers 49. The rolling rings 47 may be composed of tungsten carbide or the other metalloids listed in Dempsey, typically the identification of Crucible Steel Co. CPM9V, CPM10V and AISI H-11, H-21, T-1, M-2,or M-4 or high alloy cast iron. The end rolling ring 47 abuts an end spacer 48 of the roll 35. At the opposite end, the end rolling ring 47 abuts the web 42 of the spacer 40 near the end of the arbor 33 opposite to the pressurizer 37. The rolling rings 47 are a close fit onto the arbor 33 governed by the materials involved. The spacers are typically composed of AISI 4340 H T400 Brinell.

The pressurizer 37 includes a flanged ring 53 (FIGS. 5, 6, 7), a thrust ring 55 (FIGS. 8, 9, 10), a nut 57 (FIGS. 15, 16, 17) and an adjustable spacing collar 59 (FIGS. 11, 12, 13).

In the apparatus shown in FIG. 1, the pressurizer 37 has the same diameter as the roll 5. In alternative practice within the scope of this invention, the diameter of the pressurizer 37 may be reduced to the scrap diameter of the roll 35 which is substantially less than the roll diameter. In that case, the spacer (now numbered 48) would be of L-shape transverse crosssection like the spacer 40.

The flanged ring 53 engages the reduced section 39 of reduced diameter and abuts an adjacent end spacer 48 near the inner end of section 39. The web 61 of the flanged ring 53 extends below the abutting spacer 48. There is a clearance ring 63 between the extending end of the flanged ring 53 and edge 65 of the arbor which bounds the section 39 so that the extending end of the flanged ring 53 does not resist the expansion of the arbor 33.

The thrust ring 55 is typically of square or rectangular transverse cross-section. It is seated in the annular space bounded by the flange 67 and the web 61 of the flanged ring 53, defining a chamber 69 between the web 61 and the side of the thrust ring 55 facing the web. The flanged ring 53 has a port 71 for receiving a fixture (not shown) for injecting a fluid into the chamber 69 and a port 73 (FIG. 5) for receiving a fixture (not shown) for bleeding the fluid out of chamber 69. The flanged ring 53 has a slot 75 (FIG. 5) for receiving a ring seal 77 (FIGS. 1, 2) to seal the joint between the web 61 of the flanged ring 53 and the reduced section 39 of the arbor 33 against penetration of gas or fluid into or leakage of fluid from the chamber 69. The thrust ring 55 has a slot 79 (FIG. 8) for receiving a ring seal 81 for sealing the joint between the flange 67 and the thrust ring 55 and a slot 83 for receiving a ring seal 85 for sealing the joint between the thrust ring 55 and the reduced section 39 against leakage of fluid out of chamber 69. Typically, appropriate ring seals are sold by Parker Seal Group, Packing Division, P.O. Box 30505, Salt Lake City, Utah 84130-0505.

The nut 57 (FIG. 15) has a flange 87 and a stem 89 and carries a screw thread 91 which meshes with the thread 41 of the reduced section 39. The stem 89 has an external screw thread 93 adapted to mesh with the internal screw thread 95 (FIG. 11) of the adjustable spacing collar 59. The screw thread 93 and 95 is typically a buttress thread (FIG. 18), the surface 97 of whose teeth 99 on the side away from the roll assembly 35 is approximately perpendicular to the axis of the arbor 33. On its periphery, the nut has a hole 101 threaded at its inner end for receiving a bolt (not shown) to secure the collar to the section 39. On its face, the nut has holes 102 (FIGS. 15–17) to be engaged by a spanner wrench.

The adjustable spacing collar 59 (FIG. 11) is a ring of rectangular transverse cross-section along its periphery. In addition to the buttress thread 95, the collar has holes 103 for spanner wrench so that the collar may be threaded onto the nut 57. On its upper peripheral surface, the collar is graduated with lines 105 (FIG. 14) typically at 10° intervals to enable the collar 59 to be properly positioned with respect to the flange 67 of ring 53 and the nut 57, or to inform the user of the apparatus the extent of the movement of the collar.

Typically, the components of the pressurizer 37 are composed of AISI 4340 heat treated to approximately 400 Brinell.

Figure 2:
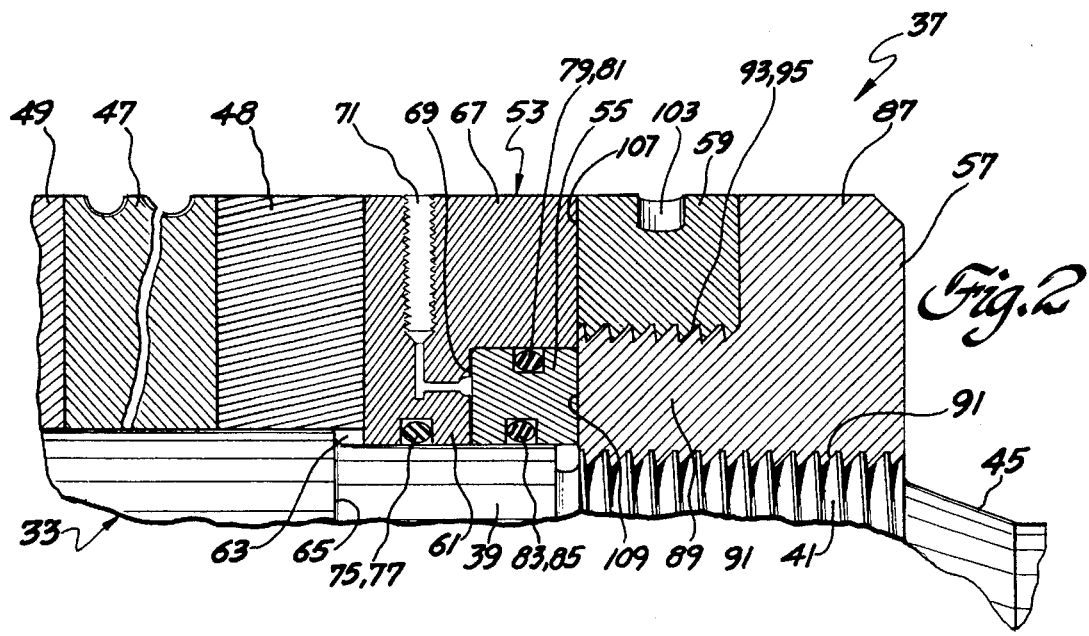
FIG. 2 is a view in longitudinal section of the pressurizer in standby condition with a fragment of the involved part of the arbor in side elevation.
Figure 3:
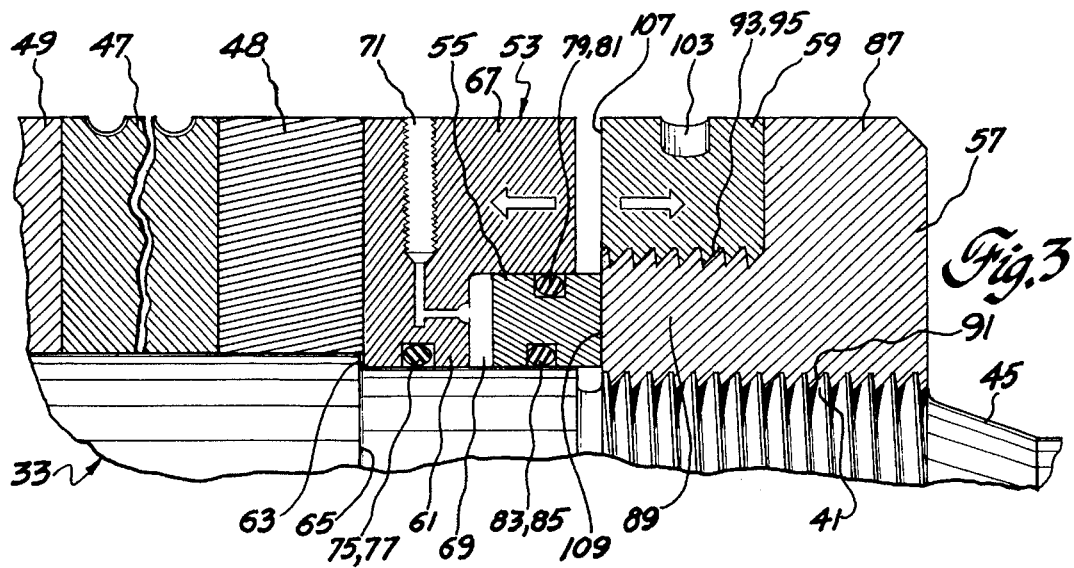
FIG. 3 is a view similar to FIG. 2 but with the arbor elongated by the impressing of pressure in the chamber of the pressurizer.
Figure 4:
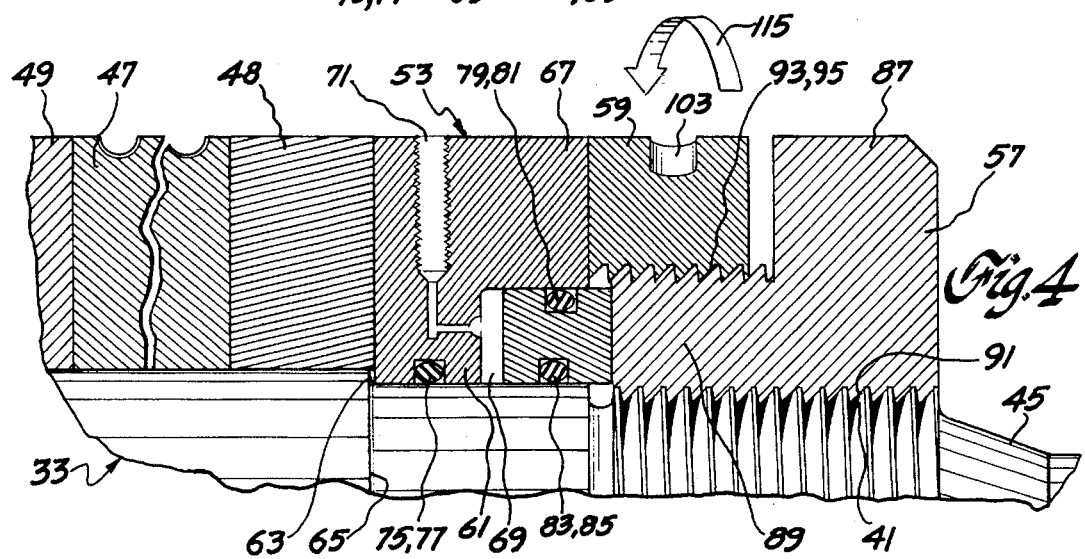
FIG. 4 is a view similar to FIG. 2 with the pressurizer set to lock the arbor in the elongated condition with the pressure removed from the chamber.

The practice of this invention is illustrated in FIGS. 2, 3, 4. After the roll assembly 35 is mounted on the arbor 33, the flanged ring 53 carrying the ring seal 77 is mounted on the reduced section 39 of the arbor 33 abutting the spacer 48. The thrust ring 55 carrying the ring seals 81 and 83 is next inserted in the annulus defined between the flange 67 and the web 61. The adjustable spacing collar 59 is then threaded on the external thread 93 of the nut 57. The adjustable spacing collar 59 and the nut 57 are so dimensioned that the outer surfaces 107 on the side of rolls 47 of the collar is flush within a few thousands of an inch with the outer surface 109 of the stem 89 of the nut. But surface 107 is set back below surface 109, i.e., surface 109 is proud of surface 107. The unit consisting of the nut 57 and the adjustable spacing collar 59 is mounted on the thread 41 positioned as shown in FIG. 2 with surfaces 107 and 109 abutting or very near to the coextensive outer end surfaces of the flange 67 and the thrust ring 55. Next, grease is injected through port 71 into the chamber 69 under pressure. Typically, the pressure is between 20,000 and 30,000 pounds per square inch and may be higher. The grease is typically LUBRIPLATE TM 1200-2 sold by Mobil Corp. The chamber 69 expands as shown in FIG. 3 advancing the thrust ring 55 which in turn exerts its force to advance the unit including the nut 57 and the adjustable spacing collar 59 to the right. The collar 59 being secured to the arbor 33 by the screw threads 93 and 41 elongates the arbor 33.

The next step in the operation is shown in FIG. 4. The adjustable spacing collar 59 is unwound from the nut 57 as indicated by arrow 115 and is brought into contact with the flange 67 of ring 53. The pressurizer is thus locked by the collar between flange 67 and the meshing screw threads 93–95. The pressure is removed from the grease in chamber 69 and the grease is bled from port 73. The lock provided by the adjustable spacing collar prevents the pressurizer 37 from resetting. The arbor remains elongated and the reaction from the elongation is taken up by the surface 97 of the teeth 99 of the buttress screw thread 95 on the right side with reference to FIG. 3 and flanged ring 53 on the left side and is transferred to the rolling rings 47 and the spacers 49 preventing displacement of the rolling rings relative to the arbor. The reactive force is effectively taken up by the buttress screw thread 97 because the surface which takes up the reactive force is approximately perpendicular to the axis of the arbor 33 so that the component of the force parallel to the axis is high and the component perpendicular to the axis is low.

The modification shown in FIGS. 19, 20, 21 includes a pressurizer 121 having a ring 123, having a projection 125 extending between its ends, typically generally centrally. The projection 125 has a buttress screw thread 127 as shown in FIG. 18. The thrust ring 55 is seated in the annulus defined by the under surface of projection 125 of ring 123, the surface 129 of adjacent sidewall of the ring 123 and the section 39. The end of the ring 123 and the inner cylindrical surface of ring 123 engages the section 39. The surface 129, the surface of thrust ring 55 facing surface 129 define between them a chamber 131. Ring seal 133 in the end of ring 123 and ring seal 81 and 85 prevent leakage into or out of chamber 131. The side of the thrust ring 55, opposite the chamber 131, engages the adjacent surface of the stem 89 of nut 57, thus connecting the arbor 33 to the chamber through thread 41. The ring 123 has a port 135 for injecting grease into chamber 121 under pressure.

FIG. 19 shows the pressurizer 121 in standby. FIG. 20 shows the pressurizer after grease under pressure, typically of 20,000 to 30,000 psi, has been injected into the chamber 131. This chamber is expanded as shown and the arbor 33 has been elongated through the connection between the side of the thrust ring opposite chamber 131 and the stem 89. As shown in FIG. 21, an adjustable spacer collar 137 whose screw thread 138 meshes with thread 127 is advanced so as to engage the wall 139 of the nut 57. The pressurizer is locked and when grease is bled from the chamber 131, the arbor remains elongated and in tension.

Figure 22:
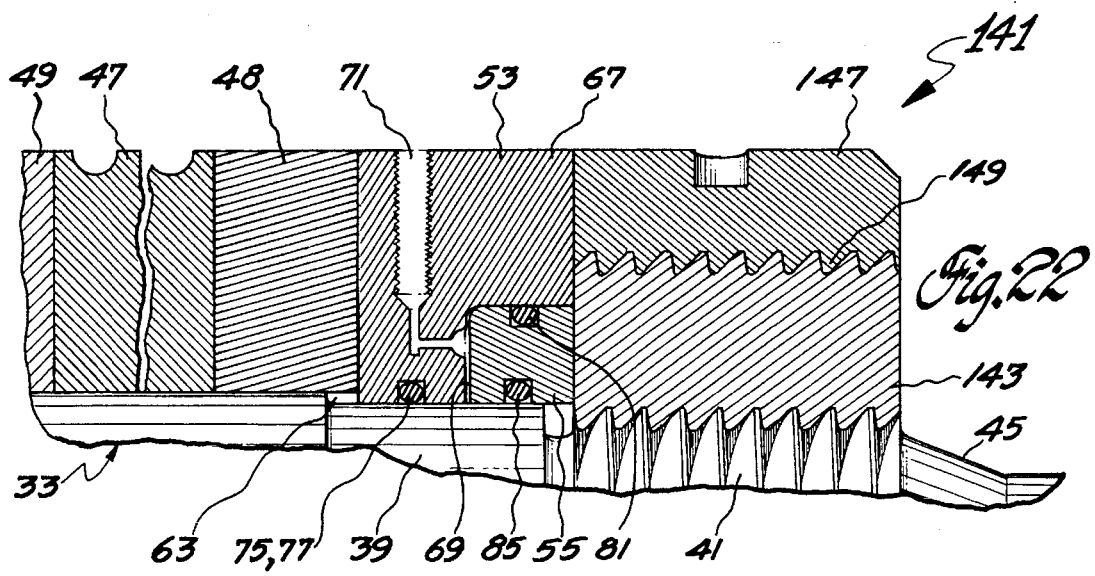
FIG. 22 is a view in longitudinal section of another modification of this invention, the pressurizer being in standby condition.
Figure 23:
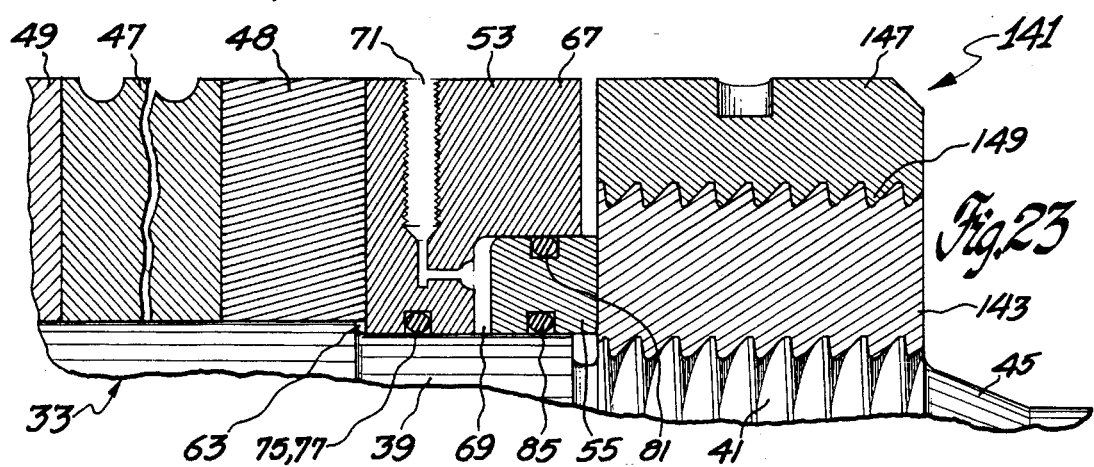
FIG. 23 is a view similar to FIG. 22 but with the pressurizer set with the chamber expanded.
Figure 24:
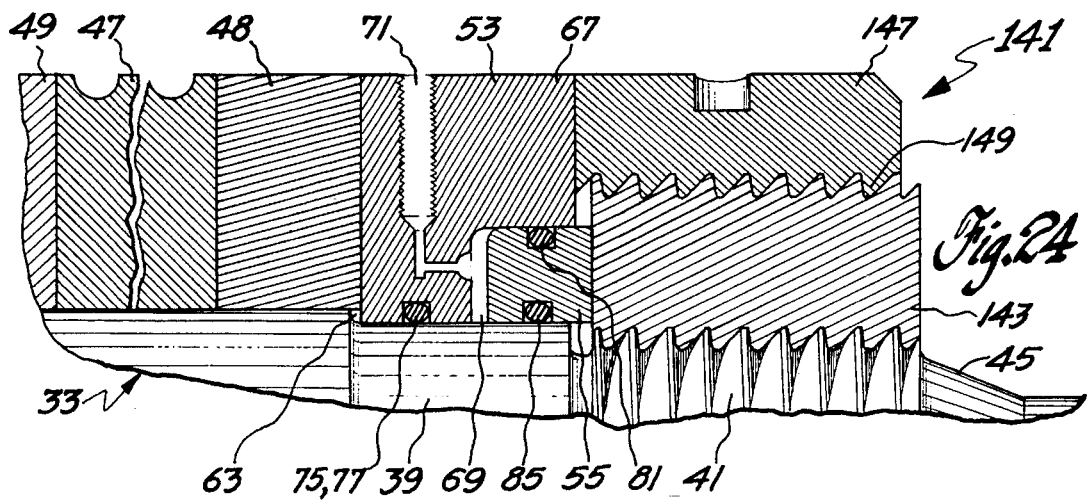
FIG. 24 is a view similar to FIG. 23 but with the pressurizer set to preserve the elongation of the arbor on the removal of pressure from the chamber.

The pressurizer 141 of the modification shown in FIGS. 22, 23, 24 includes a nut 143 threaded internally mounted on the thread 41. The nut 143 has an external buttress screw thread as shown in FIG. 18. A ring-shaped adjustable spacing collar 147, with an internal screw thread 149 as shown in FIG. 18, is mounted on nut 143. The pressurizer 141 is shown in standby in FIG. 22. In FIG. 23, the pressurizer is shown after injection of grease under pressure through port 71. The chamber 69 is expanded elongating on arbor 33. The collar 147 is unwound to the left so that its left-hand surface engages the flange 67 of the flanged ring 53 as shown in FIG. 24. The pressurizer is now locked so that the arbor remains elongated on the removal of the pressure from chamber 69.

While preferred embodiments and preferred practice of this invention have been disclosed herein, many modifications thereof are feasible. This invention is not to be limited except insofar as is necessitated by the spirit of the prior art.

I claim:

1. Roll apparatus for reducing work including an arbor having an axis, roll means mounted on said arbor for rotation therewith, means, mounted on said arbor adjacent said roll means, forming with said arbor a sealed chamber, means connecting said chamber to said arbor, means, connected to said chamber for impressing pressure on said chamber to expand said chamber, said pressure being of such magnitude as to elongate said arbor through the connection between said chamber and said arbor by a predetermined magnitude, and continuously adjustable spacer means, connected to said arbor near one end, and adapted to be adjusted while so connected, after said arbor has been elongated to be connected to said forming means thereby locking the elongated arbor against reduction of the elongation on the removal of said impressed pressure, whereby on the removal of said impressed pressure, said arbor exerts axial pressure on said roll means to suppress rotation of said roll means relative to said arbor.

2. The roll apparatus of claim 1 wherein the adjustable spacer means is adjustably connected to the forming means by threading said adjustable spacer means on a thread on the connecting means, said thread having teeth whose surface on one side is approximately perpendicular to the axis of said arbor, whereby force preventing the elongation of said arbor from being reduced is applied predominantly to said surface of the teeth of said thread.

3. The roll apparatus of claim 1 wherein the means connecting the chamber to the arbor includes a nut mounted on said arbor and the adjustable spacer is continuously adjustably positioned on a screw thread on said nut adapted to be moved along said thread into contact with the forming means to prevent reduction of the elongation of the arbor.

4. The roll apparatus of claim 1 wherein said flanged ring has a screw thread on said flange, and the adjustable spacer means has a screw thread which movably meshes with said screw thread on said flange, enabling the adjustable spacer means to be advanced into contact with said flange of said flanged ring, thereby preventing said arbor from reducing its elongation.

5. The roll apparatus of claim 1 wherein the connecting means between the chamber and the arbor is a ring having an outer surface with a screw thread mounted on the arbor, the adjustable spacer means having an inner surface with a screw thread which meshes with the screw thread on said outer surface of said ring movably along said outer surface, said adjustable spacer means being movable along the screw thread on said outer surface into engagement with said forming means and when so engaged preventing the reduction of the elongation of said arbor on removal of the pressure from said chamber.

6. The roll apparatus of claim 1 wherein the roll means is protected by a collar on an end of the arbor which is remote from the sealed chamber forming means.

7. The roll apparatus of claim 6 wherein the collar is of L-shape transverse cross-section.

8. Roll apparatus for reducing work including a rotatable arbor having an axis, roll means mounted on said arbor for rotation therewith, a pressurizing unit connected to said roll means to exert generally axial pressure thereon to suppress rotation of said roll means relative to said arbor; said pressurizing unit including: a flanged ring having a flange and a web, said flanged ring being mounted on said arbor abutting said roll means, a thrust ring seated in an annular space defined by said flange and web and by said arbor, said thrust ring being spaced from said web defining a chamber bounded by said flange, said web and said arbor, means, connected to said thrust ring, and to said flanged ring and to said arbor for sealing said chamber, another ring connected to said arbor connecting said chamber to said arbor, said other ring having a screw thread, means connected to said chamber for impressing pressure on said chamber to enlarge said chamber, said pressure being of such magnitude as to elongate said arbor through the connection between said chamber and said arbor, and an adjustable spacing collar adjustably positioned on said screw thread, said adjustable spacing collar being adjustable by being advanced on said thread of said other ring to a position in which it prevents said arbor from reducing its elongation after said pressure has been removed, thereby to cause said adjustable collar to exert axial pressure on said roll means to suppress rotation of said roll means relative to said arbor.

9. The roll apparatus of claim 8 wherein the thread on which the adjustable collar is threaded is approximately perpendicular to the axis of said arbor about which said arbor is rotatable on the side of the thread away from the flanged ring.

10. The roll apparatus of claim 8 wherein the flanged ring and the adjustable collar have facing surfaces and the adjustable collar is advanced so that its facing surface engages the facing surface of the flanged ring, whereby the adjustable collar by its engagement with the facing surface of the flanged ring prevents reduction of the elongation of the arbor.

11. Roll apparatus for reducing work including a rotatable arbor, roll means mounted on said arbor rotatable therewith, a pressurizing unit connected to said roll means to suppress rotation of said roll means relative to said arbor; said pressurizing unit including: a flanged ring having a flange and a web mounted on said arbor abutting said roll means, said flange having a screw thread thereon, a thrust ring mounted on said arbor movable along said arbor, said thrust ring being positioned on said arbor relative to said flanged ring to define a chamber, means, connected to said flanged ring and to said arbor, for sealing said chamber, means, connecting said thrust ring to said arbor, means, connected to said chamber for impressing pressure thereon to enlarge said chamber and through said thrust ring connecting means elongating said arbor, and an adjustable spacing collar having a screw thread, means mounting said spacing collar on said connecting means with its screw thread movably meshed with the thread on said flange, whereby said spacing collar is movable along said screw thread of said flange into engagement with said flange to prevent reduction in the elongation of said arbor on removal of the pressure from said chamber, whereby said arbor impresses a force on said roll means sufficient to prevent rotation of said roll means relative to said arbor.

12. Roll apparatus for reducing work including a rotatable arbor, roll means mounted on said arbor for rotation therewith, a pressurizing unit connected to said roll means to exert generally axial pressure thereon to suppress rotation of said roll means relative to said arbor; said pressurizing unit including: a flanged ring mounted on said arbor abutting said roll means in pressure-transmitting relationship therewith, a thrust ring mounted movably along said arbor connected to said flanged ring to form a chamber defined by said flanged ring, said arbor and said thrust ring, means connected to said chamber for sealing said chamber, means, connecting said thrust ring to said arbor, said thrust ring connecting means including another ring connected to said arbor, said other ring having a screw thread on an external surface thereof which is remote from said arbor, means, connected to said chamber, for impressing pressure on said chamber, expanding said chamber, said pressure being of such magnitude as to expand said chamber and through said thrust ring connecting means elongating said arbor, and an adjustable ring, having an internal screw thread, mounted on said other ring with said internal screw thread meshed with said external thread on said other ring into engagement with said flanged ring to prevent the reduction of said elongation of said arbor on removal of said impressed pressure.

13. In roll apparatus for reducing work, said apparatus including an arbor and roll means mounted on said arbor; the method of suppressing the rotation of said roll means relative to said arbor with suppressing apparatus including a chamber expandable under pressure connected to said arbor and also including a member in tension-transmitting relationship from said chamber to said arbor and an adjustable spacing collar; said method including: elongating said arbor within the elastic limit of the material of which it is constituted by impressing pressure on said chamber to expand said chamber thereby actuating said member to apply elongating tension to said arbor, advancing said adjustable spacing collar along the arbor into contact with the member to preclude the retraction of the elongated arbor from either end, and removing the impressed pressure from said chamber, whereby the arbor unable to retract exerts compressive pressure on the roll means to preclude rotation of the roll means relative to the arbor.

* * * * *